(12) United States Patent
Deburchgraeve

(10) Patent No.: US 12,236,275 B2
(45) Date of Patent: Feb. 25, 2025

(54) MASTER SLAVE PROCESSING ACQUISITION AND ROTATION

(71) Applicant: Nokia Solutions and Networks Oy, Espoo (FI)

(72) Inventor: Wouter Deburchgraeve, Espoo (FI)

(73) Assignee: Nokia Solutions and Networks Oy, Espoo (FI)

(*) Notice: Subject to any disclaimer, the term of this patent is extended or adjusted under 35 U.S.C. 154(b) by 441 days.

(21) Appl. No.: 17/635,164

(22) PCT Filed: Aug. 20, 2019

(86) PCT No.: PCT/EP2019/072246
§ 371 (c)(1),
(2) Date: Feb. 14, 2022

(87) PCT Pub. No.: WO2021/032287
PCT Pub. Date: Feb. 25, 2021

(65) Prior Publication Data
US 2022/0276902 A1 Sep. 1, 2022

(51) Int. Cl.
*G06F 9/50* (2006.01)

(52) U.S. Cl.
CPC .......... *G06F 9/5038* (2013.01); *G06F 9/5033* (2013.01); *G06F 9/505* (2013.01); *G06F 2209/5011* (2013.01); *G06F 2209/503* (2013.01)

(58) Field of Classification Search
CPC ...... G06F 9/5038; G06F 9/5033; G06F 9/505; G06F 2209/5011; G06F 2209/503
See application file for complete search history.

(56) References Cited

U.S. PATENT DOCUMENTS 5,109,329 A * 4/1992 Strelioff ............... G06F 9/4843
710/261
5,442,763 A 8/1995 Bartfai et al.
(Continued)

FOREIGN PATENT DOCUMENTS

| EP | 2551768 A1 | 1/2013 |
| JP | 2014078266 A | 5/2014 |
| WO | 2004/109996 A1 | 12/2004 |

OTHER PUBLICATIONS

Search Report for European Application No. 19 758 671.2 dated Dec. 22, 2023.
(Continued)

*Primary Examiner* — Benjamin C Wu
(74) *Attorney, Agent, or Firm* — Nokia Technologies Oy

(57) ABSTRACT

The present subject matter relates to a method comprising acquiring a master role by a processing unit of a multi-processor system, executing by the processing unit a master function part of a set of tasks: comprising searching an available processing unit of the multi-processor system; wherein in case an available processing unit is found, controlling the found processing unit to perform a slave function part of the set of tasks, and in case no available processing unit is found, executing by the processing unit the slave function part of the set of tasks, wherein the master function comprises a master to slave switching function for releasing the master role and the slave function composes a slave to master switching function for acquiring the master role.

9 Claims, 7 Drawing Sheets

(56) References Cited

U.S. PATENT DOCUMENTS

| | | | |
|---|---|---|---|
| 7,782,803 B2 | 8/2010 | Al-Harthi | |
| 7,810,094 B1 | 10/2010 | McClure et al. | |
| 9,081,501 B2* | 7/2015 | Asaad | G06F 15/76 |
| 10,365,947 B2* | 7/2019 | Sprague | G06F 9/545 |
| 2011/0302589 A1* | 12/2011 | Aussagues | G06F 9/3851 |
| | | | 718/104 |
| 2013/0024870 A1* | 1/2013 | Yamashita | G06F 9/4881 |
| | | | 718/104 |
| 2013/0036423 A1* | 2/2013 | McCready | G06F 9/5066 |
| | | | 718/103 |
| 2013/0185521 A1* | 7/2013 | Kurihara | G06F 12/0831 |
| | | | 711/146 |
| 2014/0067457 A1* | 3/2014 | Nagendra | G06Q 10/0633 |
| | | | 705/7.27 |
| 2015/0100658 A1 | 4/2015 | Lieberman et al. | |
| 2017/0039094 A1* | 2/2017 | Dice | G06F 9/526 |
| 2021/0208622 A1* | 7/2021 | Bamford | G06F 1/12 |
| 2023/0418685 A1* | 12/2023 | Kinsey | G06F 9/5083 |

OTHER PUBLICATIONS

Office Action for Indian Application No. 202217009315 dated Jul. 7, 2022 and English translation.

International Search Report for International Application No. PCT/EP2019/072246 dated Mar. 20, 2020.

Jiang Jianchun et al. "A task scheduling model and method for control-oriented multicore systems", The 2th Chinese Controla ND Decision Conference (2015 CCDC), IEEE, May 23, 2015 (May 23, 2015), pp. 5492-5497, retrieved on Jul. 17, 2015.

Shah et al., "Design and Evaluation of Agent Based Prioritized Dynamic Round Robin Scheduling Algorithm on Computational Grids", AASRI Conference on Computational Intelligence and Bioinformatics, vol. 1, 2012, pp. 531-543.

Banino et al., "Scheduling Strategies for Master-Slave Tasking on Heterogeneous Processor Grids", Proceedings of the 6th International Conference on Applied Parallel Computing Advanced Scientific Computing, Jun. 15-18, 2002, pp. 423-432.

Khan et al., "Zvrs Master Slave Parallel Task-Allocating Algorithm Using RR Scheduling and Its Implement ", 3rd IEEE International Advance Computing Conference (IACC), Feb. 22-23, 2013, pp. 610-618.

Office action received for corresponding Chinese Patent Application No. 201980099499.7, dated Oct. 28, 2024, 8 pages of office action and no page of translation available.

Oral Proceedings received for corresponding European Patent Application No. 19758671.2, dated Dec. 19, 2024, 11 pages.

* cited by examiner

MASTER SLAVE PROCESSING ACQUISITION AND ROTATION

CROSS-REFERENCE TO RELATED APPLICATIONS

This application is a national phase under 35 U.S.C. § 371 of PCT International Application No. PCT/EP2019/072246 which has an International filing date of Aug. 20, 2019, the entire contents of each of which are hereby incorporated by reference.

TECHNICAL FIELD

Various example embodiments relate to computer networking, and more particularly to a method for performing tasks through master slave rotation.

BACKGROUND

Current L1 processing architectures consist of a heterogeneous set of dedicated processing cores. In these current architectures, the complexity of the core is scaled to the complexity of the task it must execute. For example, scheduling decisions may be performed on a simple advanced risc machine (ARM) core, while computing an algorithm may be performed on a complex digital signal processor (DSP). However, other processing architectures may consist of a large pool of homogeneous processing cores (e.g. general purpose processor, GPP, cores) which are more programmable and thus flexible to execute a wide range of processing. Performing tasks in those other architectures may need improvement.

SUMMARY

Example embodiments provide a processing unit for a multi-processor system, the processing unit being configured to acquire a master role for executing a master function part of a set of tasks, the processing unit being configured to execute the master function for searching an available processing unit of the multi-processor system; wherein in case an available processing unit is found, the processing unit is configured to control the found processing unit to perform a slave function part of the set of tasks, and in case no available processing unit is found, the processing unit is configured to further execute the slave function part of the set of tasks, wherein the master function comprises a master to slave switching function for releasing the master role and the slave function comprises a slave to master switching function for acquiring the master role.

Example embodiments provide a multiprocessor system comprising the processing unit and additional one or more processing units, wherein the processing unit is configured to perform the search of the available processing unit among the additional processing units, wherein each additional processing unit of the additional processing units is configured to perform the slave function of a set of task or the master function of a set of task.

Example embodiments provide a network node comprising the multiprocessing system.

Example embodiments provide a method comprising: acquiring a master role by a processing unit of a multi-processor system, executing by the processing unit a master function part of a set of tasks: comprising searching an available processing unit of the multi-processor system; wherein in case an available processing unit is found, controlling the found processing unit to perform a slave function part of the set of tasks, and in case no available processing unit is found, executing by the processing unit the slave function part of the set of tasks, wherein the master function comprises a master to slave switching function for releasing the master role and the slave function comprises a slave to master switching function for acquiring the master role.

Example embodiments provide a method comprising: providing a set of threads, wherein a thread of the set is configured to operate in a master mode resulting in a master thread or operate in a slave mode resulting in a slave thread. The method comprises a task computation comprising: executing a scheduler by a current master thread of the set, determining by the current master thread an available thread for performing a selected current task of a set of one or more tasks of the scheduler, the determining comprising: identifying an available slave thread of the set as the available thread and in case none of the slave threads of the set is available switching the current master thread to the slave mode resulting in the available thread, executing the task by the available thread, in case the current master thread switched to the slave mode, an available slave thread of the set switches to the master mode, thereby becoming the current master thread. The method further comprises repeating the task computation for performing a further task of the scheduler until the set of tasks are performed.

According to further example embodiments, an apparatus comprises at least one processor; and at least one memory including computer program code; the apparatus comprises a set of threads, wherein a thread of the set is configured to operate in a master mode resulting in a master thread or operate in a slave mode resulting in a slave thread; the at least one memory and the computer program code configured to, with the at least one processor, cause the apparatus at least to perform a task computation comprising: executing a scheduler by a current master thread of the set;

determining by the current master thread an available thread for performing a selected current task of a set of one or more tasks of the scheduler, the determining comprising: identifying an available slave thread of the set as the available thread and in case none of the slave threads of the set is available switching the current master thread to the slave mode resulting in the available thread; executing the task by the available thread; in case the current master thread switched to the slave mode, an available slave thread of the set switches to the master mode, thereby becoming the current master thread. The apparatus is further caused to repeat the task computation for performing a further task of the scheduler until the set of tasks are performed.

According to further example embodiments, a computer program comprises instructions stored thereon for performing at least the following: providing a set of threads, wherein a thread of the set is configured to operate in a master mode resulting in a master thread or operate in a slave mode resulting in a slave thread; performing a task computation comprising: executing a scheduler by a current master thread of the set; determining by the current master thread an available thread for performing a selected current task of a set of one or more tasks of the scheduler, the determining comprising: identifying an available slave thread of the set as the available thread and in case none of the slave threads of the set is available switching the current master thread to the slave mode resulting in the available thread; executing the task by the available thread; in case the current master thread switched to the slave mode, an available slave thread of the set switches to the master mode, thereby becoming the current master thread; repeating the task computation for performing a further task of the scheduler until the set of tasks are performed.

BRIEF DESCRIPTION OF THE DRAWINGS

The accompanying figures are included to provide a further understanding of examples, and are incorporated in and constitute part of this specification. In the figures.

DETAILED DESCRIPTION

Figure 1:
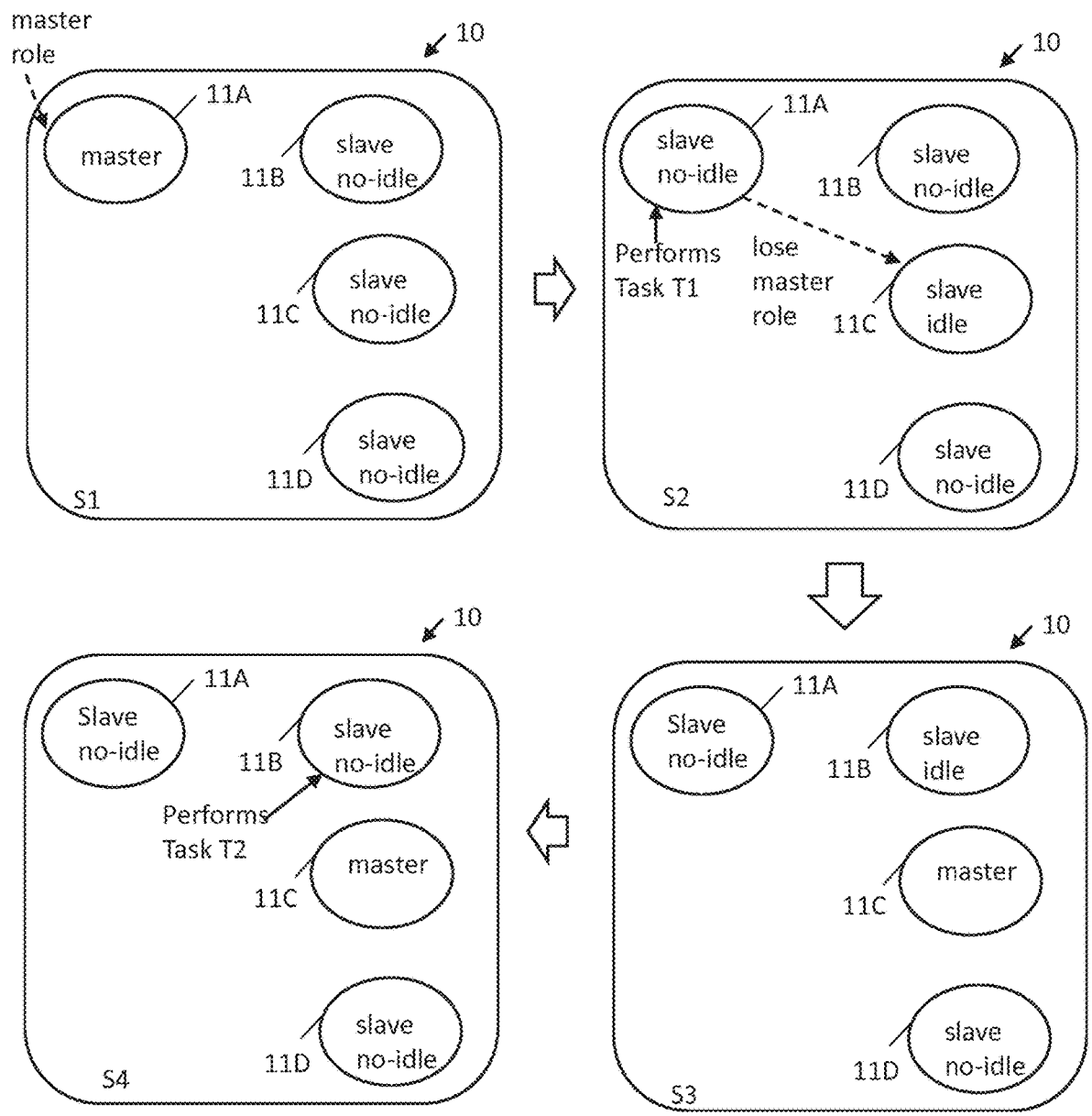
FIG. 1 depicts a diagram of a multi-processing system comprising multiple processing units according to an example of the present subject matter.

In the following description, for purposes of explanation and not limitation, specific details are set forth such as particular architectures, interfaces, techniques, etc., in order to provide a thorough understanding of the examples. However, it will be apparent to those skilled in the art that the disclosed subject matter may be practiced in other illustrative examples that depart from these specific details. In some instances, detailed descriptions of well-known devices and/or methods are omitted so as not to obscure the description with unnecessary detail.

The processing unit that performs the execution of the master role may be a master processing unit (master) of the multi-processing system. The processing unit that performs the slave function may be a slave processing unit (slave).

In one example, the processing unit may acquire the master role at an initialization phase of the present subject matter. The initialization may be performed or controlled by a supervisor. The supervisor may be a processing unit of the multi-processing system which is permanently assigned as the supervisor. The supervisor may for example select and control the selected processing unit to acquire the master role. By acquiring the master role, the processing unit may be enabled to execute the master function which is associated with the master role. The initialization phase may, thus, result in an appointment of a master processing unit executing the master function. The execution of the master function may comprise receiving a task to be performed. The execution of the master function may enable to execute the received task e.g. associated with a master thread. The master function may be referred to as a function of the task. After the initialization of the selected processing unit, a master to slave assignment rotation scheme is further enabled by embodiments in accordance to the present subject matter in order to perform the set of tasks. For example, after the initialization phase and if the master role is released, a processing unit may acquire (again) the master role by executing the slave to master switching function. The master function and the slave function may enable a master and slave execution flow respectively.

Other processing units, of the multi-processor system, may be initialized at the initialization phase so that they try or attempt to acquire the master role if they are not executing a task. This may be performed by repeatedly executing the slave to master switching function by each of the other processing units if they are not executing other functions e.g. if they are in an idle state. Alternatively, or in addition, after the initialization phase, the other processing units may be configured to acquire the master role by executing the slave to master switching function as part of an execution of the slave function.

The processing unit may be configured to read instructions in order to perform a function such as the slave and master functions. For example, the processing unit may comprise components that enable reception and execution of the instructions. The components may for example comprise registers, an arithmetic logic unit (ALU), a memory mapping unit (MMU), cache memories, an I/O module etc., several of which may be co-located on a single chip.

As used herein, the term "task" refers to an operation that can be carried out by one or more processors of one or more computers. The task may for example comprise multiple instructions. The task may comprise multiple functions, wherein each function may be associated with respective instructions.

The present subject matter may enable a scheme where there may be no fixed "master/slave" assignment, but every equal processing unit can start as a potential slave or master. The actual master assigns the intensive processing to a slave, unless no slave can be found (e.g. because they are all occupied) and then the master has to be slave itself releasing the master role by executing the master to slave switching function. The intensive processing may be performed by the execution of the slave function. This may ensure a low latency distribution of the work over the different processing units via the rotation of the master role.

A master processing unit, in accordance with the present subject matter, which becomes a slave may not always immediately be followed up by a new master, so all processing units can be executing as a slave. This may ensure that all clock cycles of the processing units of the multi-processing system can be dedicated to processing when the processing load is high and no cycles are wasted in a master functionality. A master is only running when there are clock cycles available for processing (i.e. a slave finished the job) and no master is running when all clock cycles are used by slaves for the processing. This may ensure a maximum allocation of cycles to advance the processing pipeline of the set of tasks and a minimal waste in the master function of scheduling, forwarding and task distribution. For example, no processing unit in the multi-processing system may ever block or busy wait because every cycle is used to either process tasks or find new tasks to process. This may maximize the usage efficiency of the available cycles and keep latency low.

The present subject matter may enable a non-blocking software architecture in which all processor cycles may be used as efficiently as possible so that complex cores can be used to intermittently execute computationally simple tasks without impact on the computationally intensive tasks.

The multi-processing system my for example be comprised in a cloud radio access network (C-RAN) for enabling at least part of C-RAN's tasks. For example, the multi-processing system may be used to enable data communication between base stations and end users or to enable tasks involved in a large-scale deployment, collaborative radio technology support, and real-time virtualization capabilities of the C-RAN. Using the multi-processing system may bring significant computational advantages in C-RAN. Non-wireless cloud systems, which are interconnected, for example, via optical wires or other cable interconnects, or via a mix of wired and non-wired connections, may incorporate embodiments in accordance with the present subject matter.

Embodiments in accordance to the present subject matter may for example be used in a cyber-physical system in order to meet the strict quality of service (QoS) requirements for data communication in this kind of systems. The cyber-physical system may for example implement a distributed automation application e.g. a cyber physical application. The distributed automation application may for example enable a factory automation e.g. for motion control or mobile robots. In another example, the distributed automation application may enable a process automation e.g. for process monitoring. The network node of the present subject matter may for example be used as a $5^{th}$ generation (5G) network node to enable communication of data between devices of the cyber-physical system. For example, using the present method may speed up the tasks performed at the 5G network node. Alternatively, or in addition the devices of the cyber-physical system may comprise the multi-processing system in accordance with the present subject so that they can perform faster their tasks. Using the multi-processing system in the cyber-physical system may particularly be useful for the following reasons. Current standard and product development for 5G new radio ultra-reliable and low-latency communications (5G NR URLLC), and specifically factory automation use cases, require a communication service availability of $10^{-5}$ to $10^{-9}$ within a limited time budget of 0.5-2 milliseconds. In addition, industrial automation use cases such as motion controls may require a deterministic availability of communication services as high as a nine nines figure for periodic traffic patterns. The present subject matter may enable to fulfil such requirements.

In one example, the network node may be a 5G fixed wireless access (FWA) node that is configured to perform tasks involved in the 5G FWA using the multi-processing system.

According to an example, upon finishing execution of the slave function, another processing unit, of the multi-processor system, having no master role is configured to attempt to acquire the master role by executing the slave to master switching function for acquiring the master role.

According to an example, the processing unit is configured to release the master role by releasing a master lock, wherein the acquiring of the master role comprises acquiring the released master lock.

According to an example, the master function comprises a scheduler for scheduling the set of tasks and an output forwarding function for providing results of a previous task on which the task depends. The slave function comprises a task processing function of at least one task.

According to an example, the execution of the slave to master switching function by a processing unit is successful if the master to slave switching function was executed earlier by this processing unit or by another processing unit and if the master lock is free. However, a slave may execute the slave to master switching function anytime it has finished its task e.g. anytime it is in idle state.

According to an example, the processing units are homogenous processing cores.

The processing units as described above may be configured to perform at least part of the present subject matter using threads. For example, the processing unit is configured to execute the master function using a master thread of a pool of threads of the multi-processor system, and being configured to execute the slave function using a slave thread of the pool of the threads. Using threads may enable an efficient execution of the present subject matter and seamless integration of the present subject matter in existing systems.

According to an example, the multi-processor system further comprises the pool of threads and a supervisor thread. The supervisor thread is configured to set up slave threads and at least one master thread in the pool, wherein the additional processing unit is configured to execute the master function using the master thread of the pool and to execute the slave function using the slave thread of the pool. The supervisor thread may be executed by the supervisor.

A thread may be a sequence of programmed instructions that can be managed independently, e.g. by a scheduler which is typically a part of the operating system. A thread may, for example, enable to process one or more tasks.

For example, a thread based method may be provided. The thread based method comprises providing a set of threads, wherein a thread of the set of threads is configured to operate in a master mode resulting in a master thread or operate in a slave mode resulting in a slave thread. The method comprises a task computation comprising: executing a scheduler by a current master thread of the set of threads, determining by the current master thread an available thread for performing a selected current task of a set of one or more tasks of the scheduler, wherein the determining comprises: identifying an available slave thread of the set of threads as the available thread and in case none of the slave threads of the set of threads is available switching the current master thread to the slave mode resulting in the available thread, executing the task by the available thread, in case the current master thread switched to the slave mode, an available slave thread of the set of threads switches to the master mode, thereby becoming the current master thread. The method further comprises repeating the task computation for performing a further task of the scheduler until the set of tasks are performed.

The execution of the master thread may be performed by a respective master processing unit and the execution of the slave thread may be performed by a respective slave processing unit.

The present subject matter may enable a self-scheduling of compute resources through the master slave rotation. For example, each thread of the set of threads may be executed on a respective processing unit of a pool of processing units. The master-slave responsibility rotation between resources in the pool of processing units may ensure that each processing unit in the pool of processing units can contribute simultaneously to processing high processing complexity functions and still maintain a low latency execution of all other functions such as scheduling, synchronization and forwarding functions.

The execution of the task computation may result in a task of the set being performed using a respective master thread. This master thread may or may not be the same master thread used for performing another task of the set.

According to an example, a task of the set comprises a sequence of functions. The sequence of functions comprises a task processing function and an output forwarding function. The executing of the scheduler further comprises executing by the current master thread the output forwarding function of a previous task of the set that has been performed in a last iteration, wherein executing the current task comprises executing the task processing function of the current task using an output of the previous task that resulted from the execution of the output forwarding function.

The set of tasks may for example comprise tasks of a multistage pipeline. This may enable a functional split, of each pipeline stage of the pipeline, that matches the master-slave functionality. For example, the master-slave rotation and pipeline stage split may enable a scalable amount of parallelism that automatically matches algorithmic requirements to available physical compute resources without a need for a manual tuning. If enough parallelism is available in the set of tasks, the present method may automatically match the parallelism to the maximum of the physical resources.

The rotation of the master functionality and functional split up of a task into master executed functions and slave executed functions may allow to optimally use a self-scheduling. The master executed functions may be administrative functions such as scheduling and forwarding. The slave executed functions may be computationally intensive functions. For example, a homogeneous set of processing resources may be used for a computationally intensive pipeline of task processing functions while still executing administrative functions with a minimum of cycles and low latency.

According to an example, executing by the current master thread the output forwarding function of the previous task comprises checking by the current master thread if the output of the previous task is available, and in response to determining that the output of the previous task is not available, repeating the checking until the output is available.

This may prevent that the result of a slave thread stays in the pipeline until a next task of that pipeline stage is executed. If the output is not available, the master thread may refer back to the scheduler. This may enable a loop, involving the output forwarding function, that functions as a regular polling for completion of already asynchronously running tasks on slave processing units.

According to an example, the sequence of functions comprises a data preparation function for preparing input data of the task processing function using the output of the previous task. The executing of the scheduler further comprises executing the data preparation function.

After executing the output forwarding function for obtaining the output of the previous task, the task processing function of the current task may be performed in order to prepare the input data. The input data are used by the determined available thread in in order to execute the task processing function of the current task. This may enable a further functional split of each pipeline stage of the pipeline that matches the master-slave functionality in accordance with the present subject matter. This may increase the type of tasks that may be performed by the present method.

According to an example, executing the data preparation function results in input data. The input data may be input in an input queue of the determined slave thread, wherein executing the current task comprises reading the input data from the input queue and executing the task processing function.

According to an example, the execution of the functions of the task is triggered by the executed scheduler.

The scheduler may for example be configured to select which current task of the set of tasks is to be performed in a current iteration of the method and to assign an execution of each function of the selected task to a thread. For example, the scheduler may assign the execution of the output forwarding function of a previously selected task of the set and the data preparation function of the current selected task to the current master thread. The scheduler may assign the execution of the task processing function of the current selected task to the determined available thread. The scheduler may assign a function of determining the available thread to the current master thread. This may enable a self-scheduling of homogeneous set of processing resources.

According to an example, the repeating comprises concurrently executing two or more tasks of the set of tasks. For example, the task processing functions of different tasks of the set of tasks may be independent and thus may be executed in parallel by the respective threads. This may enable to speed up the execution of the set of tasks.

According to an example, the repeating of the task computation is performed for a first scheduler. The method further comprises repeating the task computation for a second scheduler using a current master thread to execute the second scheduler for performing a further task of the second scheduler until the set of tasks of the second scheduler are performed. The current master thread that executes the second scheduler is different from the current master thread that executed the first scheduler.

Using multiple master threads may be useful when there are many tasks at a high rate and/or when the serial execution of the master functionality limits the use of parallelism in the set of threads.

For example, a first and second scheduler may be provided. The first scheduler may be associated with a first set of tasks and the second scheduler may be associated with a second set of tasks. The first and second sets of tasks may be part of a same larger set of tasks that is split into the first and second sets of tasks. This may for example be useful when the first scheduler has too many tasks (e.g. the larger set) associated to it and the serial execution of master's functions becomes a bottleneck that prevents the concurrent use of all available slave threads in the pool. The two schedulers/master threads can be started so that they can process respective tasks of the larger set. The set of threads comprises two different master threads that may be used for executing respectively the two schedulers. And the method may separately be performed for each of the first scheduler and the second scheduler using the same slave threads of the set of threads.

According to an example, the providing of the set of threads comprises: providing a supervisor thread; setting up by the supervisor thread the scheduler; determining the set of tasks to be performed by the scheduler; starting each thread of the set of threads as a slave thread; selecting from the set of threads one thread as the current master thread.

According to an example, a thread of the set of threads is configured to operate in master mode by acquiring a master lock, and to switch to a slave mode by releasing the master lock, wherein a slave thread is configured to acquire the master lock for switching to the master mode.

According to an example, each thread of set of threads is configured to be executed on a respective processing core of a set of processing cores.

According to an example, the set of processing cores are homogenous cores. For example, the set of cores include 5 identical cores.

According to an example, the available slave thread of the set of threads that switches to the master mode is a slave thread that executed a task of the scheduler in a previous iteration of the task computation. This may enable a controlled task execution that is scheduler specific.

FIG. 1 depicts a diagram of a multi-processing system 10 comprising multiple processing units 11A-D. The multi-processing system 10 enables a master-slave role rotation scheme for executing a set of tasks. The set of tasks may comprise two tasks T1 and T2 for exemplification purpose only, but it is not limited to. Also, for exemplification purpose, only four processing units are shown in FIG. 1.

Each processing unit 11A-D may include several components. A component of the components may for example be an operational unit such as an execution unit and instruction retirement unit. The components may further comprise internal memory locations to store data, such as registers and caches. For example, internal memory locations may be used to define the characteristics of the various memory areas for instructions execution purposes.

The multi-processing system 10 may be coupled to a system memory (not shown) through a memory controller of the multi-processing system 10. The system memory may store instructions to be executed by the processing units 11A-D. Individual processing units 11A-D can send interrupts to other processing units, e.g. using inter-processor interrupts (IPIs), to request some functional work to be performed by the one or more other processing units that are the target(s) of the IPIs.

Each individual processing unit 11A-D may operate in accordance with a master mode or slave mode. In each of the two modes, the processing unit may execute respective functions.

The present subject matter enables a master to slave assignment rotation scheme between the processing units of the multi-processing system 10 so that the set of tasks T1 and T2, whose instructions may reside in the memory system, may be performed. For that, the multi-processing system 10 may be initialized (e.g. using a boot routine of the multi-processing system 10 or a supervisor as described herein) so that one of the processing unit acquires, first, a master role in order to perform the set of tasks. In addition, each of the other processing units may be configured to acquire the master role e.g. by regularly checking if the master role is free and not used by any other processing unit. This initialization may trigger the master to slave assignment rotation scheme in accordance with the present subject matter so that the set of tasks may be performed.

FIG. 1 shows multiple status stages (S1-S4) of the multi-processing system 10 during execution of the tasks T1 and T2. In a first status stage (S1), the processing unit 11A may be initialized as a master processing unit. Each of the other processing units 11B-D may be in idle state or may be executing a slave function. For simplification of the description, none of the processing units 11B-D is in idle state in the first status stage.

After becoming master for the execution of the set of tasks T1 and T2, the master processing unit 11A may identify if a processing unit is available. Since all the processing units 11B-D are not in idle state, the master processing unit 11A may not find an available processing unit (e.g. if it would have found one available processing unit, that one may execute a slave function of T1). In this case, the master processing unit 11A will lose the master role in order to perform itself a slave function of the task T1. This is indicated in the second status stage (S2) of the multi-processing system 10. During the second status stage, the master role may be acquired by the processing unit 11C because it became idle and tried to acquire the master role. The task T1 may be completed during the second status stage by the processing unit 11A.

In the third status stage (S3), the new master processing unit 11C would search for an available processing unit (e.g. 11B) among processing units 11A-B and 1D. FIG. 1 indicates that the processing unit 11B is available in the third status stage. Thus, the new master processing unit 11C may assign another slave function of the task denoted T2 to the processing unit 11B. The processing unit 11B may perform the task T2 as indicated in the fourth status stage (S4). During this third status stage, the processing unit 11C remains the master.

Figure 2:
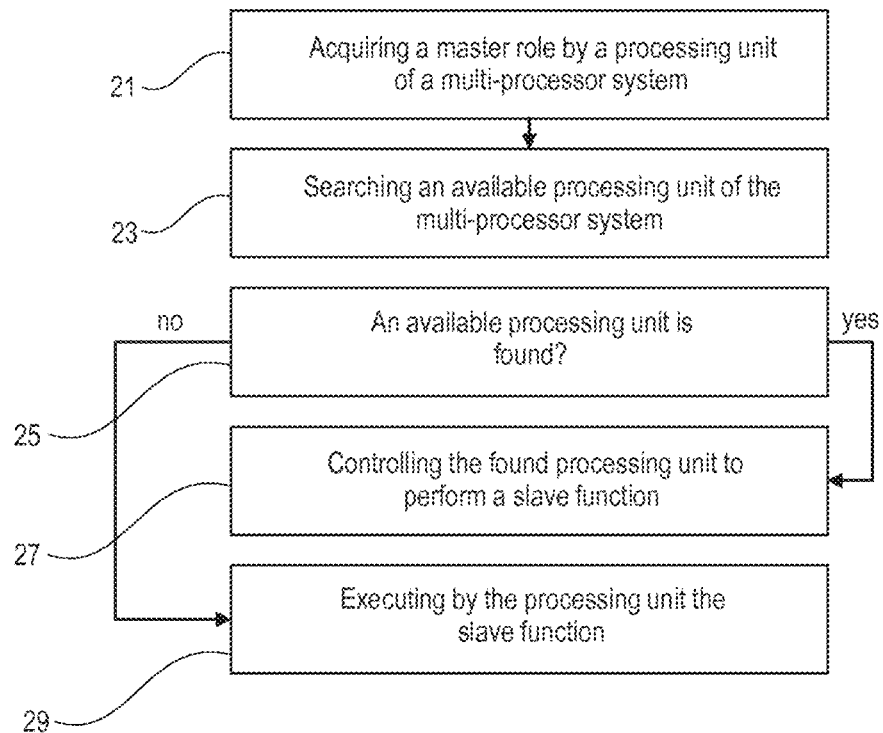
FIG. 2 is a flowchart of a method for controlling a processing unit according to an example of the present subject matter.

FIG. 2 is a flowchart of a method for controlling a processing unit (named first processing unit) in accordance with the present subject matter. The first processing unit may be controlled to initiate/trigger the execution of the set of one or more tasks. For that, one or more additional processing units of a multiprocessing system may be provided. The first processing unit may for example be part of the multi-processing system. The processing units of the multi-processing system may self cooperate through a master to slave assignment rotation scheme to perform the set of tasks.

The first processing unit may have a loaded set of instructions that enables to perform at least part of the present subject matter.

In step 21, the first processing unit may acquire a master role. For example, the first processing unit may execute an instruction that enables the acquisition of a master lock. The master lock may be associated with the set of tasks. Acquiring the master lock may enable the first processing unit to execute further instructions for initiating and controlling the execution of the set of tasks in accordance with the present subject matter.

In one example, a scheduler may be used for scheduling the tasks of the set of tasks based on their dependencies. In this case, the master lock may be associated with the scheduler, so that the execution of the scheduler is conditional to the acquisition of the master lock.

In step 23, the first processing unit may execute a master function of a task of the set of tasks. For example, if the set of tasks are two dependent tasks T1 and T2 where T2 depends on the results of T1, the task T1 may first be executed.

The master function may comprise multiple functions that enable the execution of the task. For example, the master function may comprise a function to identify a processing unit to perform a slave function of the task. If the scheduler is used, the scheduling function of the scheduler may be part of the master function. The master function further comprises a master to slave switching function for releasing the master role. The slave function comprises a slave to master switching function for attempting to acquire, and possibly acquiring, the master role if no other processing unit has the master role for this set of tasks, and if the master role was released earlier. The switching functions may enable the master-salve role rotation in an efficient manner.

Thus, in step 23, the first processing unit may search an available processing unit of the multi-processor system. An available processing unit may be a processing unit that is in an idle state.

In case (inquiry step 25) an available processing unit is found, the first processing unit may control in step 27 the found processing unit to perform the slave function of the task. For example, the slave function's instructions may be a loaded set of instructions at the found processing unit.

However, in case no available processing unit is found, the first processing unit may execute in step 29 the slave function of the task. This may be performed by releasing the master role by executing the master to slave switching function. In this case, an available processing unit, e.g. a unit that finishes execution of a slave function, and thus having no master role, may attempt to acquire the master role by executing the slave to master switching function. And if the attempt is successful, this may result in a new master processing unit.

Thus, the execution of steps 27 or 29 may result in the new master processing unit or may result in maintaining the same master processing unit. In both cases, the next task of the set of tasks may be performed by repeating steps 23-29 e.g. by performing the master function of the task by the new or maintained master processing unit. This may enable a self-scheduling pool of processing units to perform the set of tasks.

Figure 3:
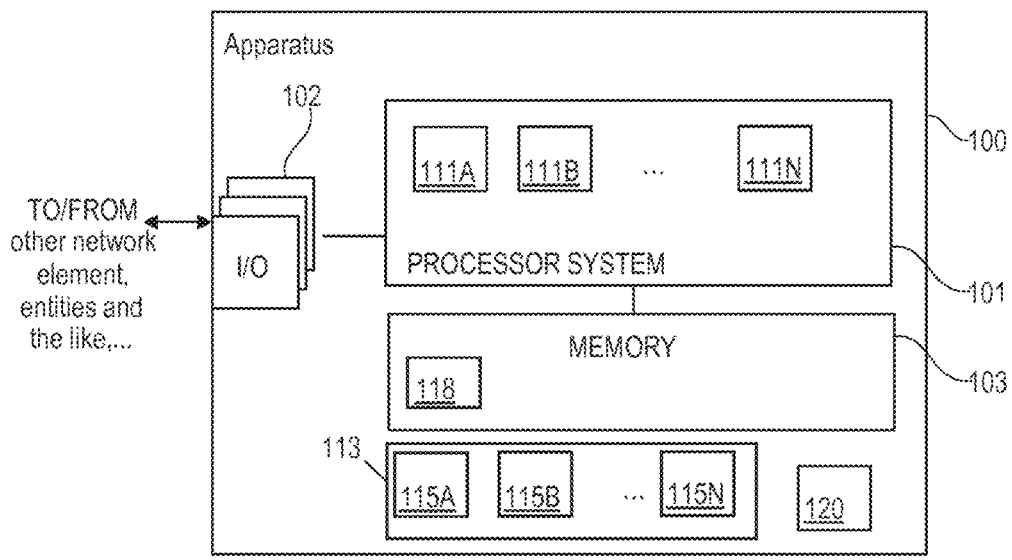
FIG. 3 is a block diagram showing an apparatus according to an example of the present subject matter.

FIG. 3 is a block diagram showing an apparatus according to an example of the present subject matter. The apparatus may for example the multi-processing system e.g. of FIG. 1.

In FIG. 3, a block circuit diagram illustrating a configuration of an apparatus 100 is shown, which is configured to implement at least part of the present subject matter. It is to be noted that the apparatus 100 shown in FIG. 3 may comprise several further elements or functions besides those described herein below, which are omitted herein for the sake of simplicity as they are not essential for the understanding. Furthermore, the apparatus 100 may be also another device having a similar function, such as a chipset, a chip, a module etc., which can also be part of an apparatus or attached as a separate element to the apparatus, or the like.

The apparatus 100 may comprise a processor system 101 (e.g. such as the multi-processing system 10) having a plurality of processor cores 111A-N. Each core of the cores 111A-N may include various logic and control structures to perform operations on data responsive to instructions. In one example, each core of the cores 111A-N may include a processor, a microprocessor, application specific integrated circuit (ASIC), field programmable gate array (FPGA), or other types of processing logic that may interpret and execute instructions. In one example, the cores 111A-N may be a homogeneous set of complex processor cores executing all functions both computationally complex and simple. The complex cores may, for example, be shared by both simple and complex functions. The present subject matter may enable that all processor cycles are used as efficiently as possible such that complex cores can be used to intermittently execute computationally simple functions without impact on the computationally intensive functions. Although only one processor system 101 is illustrated, the present subject matter may be employed by computing systems that include multiple processor systems as well.

Reference sign 102 denotes transceiver or input/output (I/O) units (interfaces) connected to the processor 101. The I/O units 102 may be used for communicating with one or more other network elements, entities, terminals or the like. The I/O units 102 may be a combined unit comprising communication equipment towards several network elements, or may comprise a distributed structure with a plurality of different interfaces for different network elements. Each processor core 111A-N may, for example, include several components. A component of the components may, for example, be an operational unit such as an execution unit and instruction retirement unit. The components may further comprise internal memory locations to store data, such as registers and caches. For example, internal memory locations may be used to define the characteristics of the various memory areas for instructions execution purposes.

Reference sign 103 denotes a memory usable, for example, for storing data and programs to be executed by the cores 111A-N and/or as a working storage of the processor system 101.

The apparatus 100 comprises a pool of threads 113 comprising threads 115A-N. Each thread of the pool 113 is configured to operate in a master mode (and thus be master thread) or to operate in a slave mode (and thus be a slave thread). Each thread of the pool 113 is, for example, configured to switch from the master mode to the slave mode if none of the slave threads of the set is available to perform a task of a scheduler 118. Each thread of the pool 113 is, for example, configured to switch from the slave mode to the master mode after completing a task that is received from the scheduler 118 executed by a master thread of the pool 113 and if that master thread has switched from the master mode to the slave mode and none of the threads of the pool is executing the scheduler 118.

For simplification of the description, only one scheduler 118 is shown but it is not limited to. For example, a given list of tasks e.g. three tasks t1, t2 and t3 may be assigned to the scheduler 118. Each task of the tasks may for example comprise an output forwarding function (FWD function) and a task processing function (PROC function).

The scheduler 118 may be configured as follows. The scheduler 118 may be executed on a thread of the pool 113 that is currently a master thread. After selecting the first task e.g. t1 of the list, the scheduler 118 may assign the master thread on which it is executed the function of identifying a slave thread to execute the PROC function of the task t1, and in case it can't find the slave thread, the master may switch to the slave mode and execute the PROC function of the task t1. If the slave thread is found, the master thread on which the scheduler is executed may inform the scheduler of the found slave thread. In response to that information, the scheduler may assign the execution of the PROC function of the task t1 to the found slave thread. The scheduler 118 may assign the master thread on which it is executed the execution of the FWD function of the task t1. The FWD function of the task t1 is configured to determine the output that results from the execution of the task t1 and to determine which task (t2) of the list is to be performed next.

If the FWD function of the task t1 is successfully executed to determine the output of the task t1, the master thread on which the scheduler 118 is executed may execute the function (assigned by the scheduler 118) of identifying a slave thread to execute the PROC function of the task t2, and in case it can't find the slave thread, the master may switch to the slave mode and execute the PROC function of the task t2. Assuming for example, that the master thread switched to the slave mode to execute the PROC function of the task t2 and a slave thread has become the (new) current master thread.

The scheduler may be executed on this new current master thread. The executed scheduler 118 may assign the new current master thread on which it is executed the execution of the FWD function of the task t2. The scheduler is configured so that it has access (knows) if a previous instance of a task is already running. This information may be embedded in a global context of the task which keeps a list of running instances of this task. When the scheduler selects a task, this context indicates that a previous instance of it is running and needs to be checked for completion and for obtaining results by the FWD function. If the FWD function of the task t2 is successfully executed, the new master thread on which the scheduler 118 is executed may execute the function (assigned by the scheduler 118) of identifying a slave thread to execute the PROC function of the task t3, and in case it can't find the slave thread the new current master thread may switch to the slave mode and execute the PROC function of t3 etc.

The apparatus 100 comprises a supervisor thread 120. The supervisor thread 120 may be configured to perform an initialization step or phase for enabling execution of tasks in accordance with the present subject matter. The initialization step may comprise the setting of one or more schedulers 118. The tasks that need to be executed by the cores 111A-N are connected or associated to the scheduler 118. The scheduler 118 may be configured to select which task to run and to assign execution of functions forming the task to respective threads.

The initialization step may further comprise starting each thread in the pool of threads 113 as a slave thread so that the threads 115A-N may be pre-instantiated idle threads which stand ready to receive functions to be performed. The pre-instantiation may prevent having to incur the overhead of creating a thread a large number of times. The initialization step may further comprise the selection of a thread of the pool 113 as a master thread for the scheduler 118. Once the pool is running, the supervisor thread may no longer be needed.

The supervisor thread 120 is shown as an external thread of the pool 113. In another example, the supervisor thread 120 may be a thread of the pool of thread 113. In this case, the supervisor thread 120 may not have to select a thread of the pool 113 to become the master, and could just promote itself to become the master of the pool 113. Or the supervisor thread 120 may select another thread to be the master and itself become a slave thread of the pool 113. This may enable that each core 111A-N executes either a master or slave execution path.

The master execution path or flow may comprise at least the execution of the FWD function, the identification of a slave thread to perform the task processing function and to execute the task processing function if no slave thread is found. The salve execution path or flow may comprise at least the execution of the task processing function and the execution of a function in order to try to become a master thread.

The instructions of the scheduler 118 are run by the master thread of the pool of threads 113. When the scheduler 118 has selected a task, the master thread searches for a slave thread of the threads 115A-N that is idle to divest the work to. When no idle slave is found, the master thread becomes a slave thread and starts executing the work itself. Each slave thread of the threads 115A-N may, after it finished its work, tries to become the master of the scheduler 118. When the slave thread succeeds in becoming the master thread, it starts running the scheduler 118. The functions executed by the slave thread may be the ones with high computational complexity, and those of the master thread may have low computational complexity but may require low latency execution.

Each thread of the pool of threads 113 may be executed by a respective core of the cores 111A-N. The cores 111A-N may thus enable to do their own scheduling, synchronization and forwarding (as a master) and still take part in the computationally intensive processing (as a slave). The cores 111A-N may maximize their available instructions to the computationally complex tasks while at the same time minimize latency and cycles on the computationally simple tasks like scheduling, synchronization and forwarding.

Figure 4:
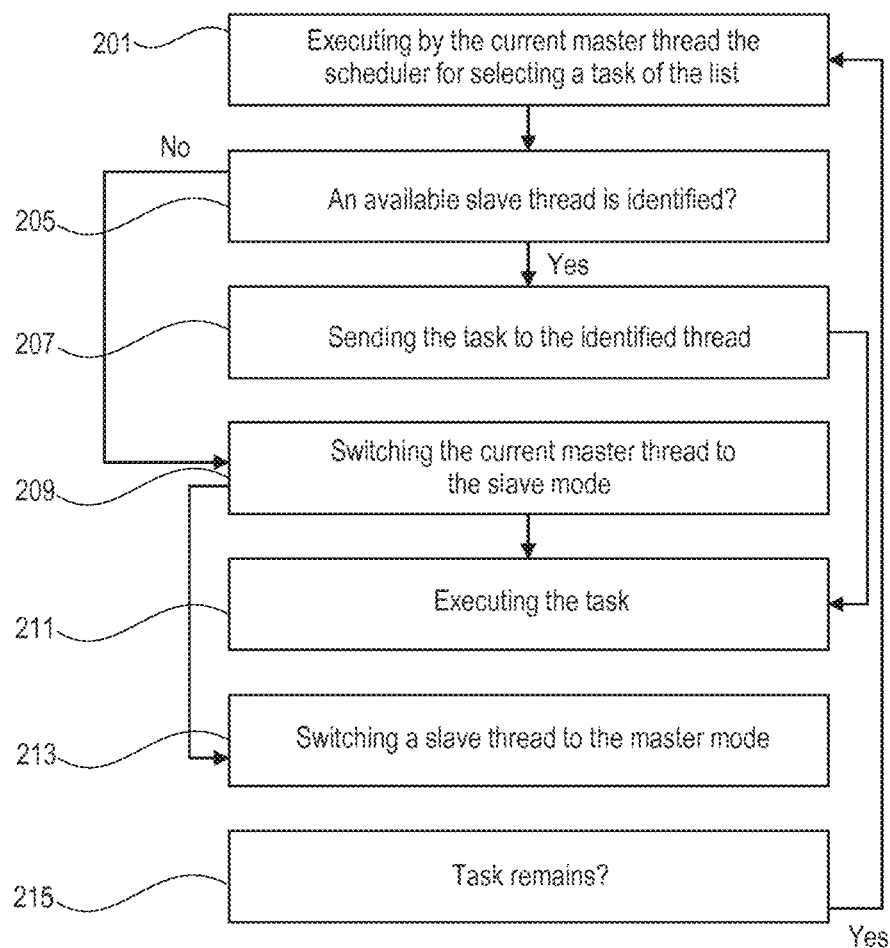
FIG. 4 is a flowchart of a method for performing tasks in accordance with an example of the present subject matter.

FIG. 4 is a flowchart of a method for performing tasks in accordance with an example of the present subject matter. For the purpose of explanation, the method may be implemented in the system illustrated in previous FIG. 3, but is not limited to this implementation. The method of FIG. 4 may enable to implement, using threads, the master slave rotation scheme as described herein e.g. with reference to FIG. 1 and FIG. 2.

The scheduler 118 may first be assigned or associated with a list of tasks to be performed. The list of tasks may be dependent tasks. For example, the list of tasks may be tasks of a pipeline having multiple stages. Tasks of two consecutive pipeline stages may be dependent in that a task of a pipeline stage uses an output of another task of the preceding pipeline stage. The scheduler 118 may be configured to select from the list of tasks which task to run. The selected tasks may be run using a set of threads such as threads 115A-N of the pool of threads 113.

The set of threads 115A-N may be setup as described above so that one of the threads e.g. thread 115B may be a current master thread for execution of the scheduler 118. In step 201, the scheduler 118 may be executed by the current master thread 115B. The execution of the scheduler 118 may comprise a selection of a task of the list of tasks to be performed. The selection may for example be performed using a priority algorithm that takes into account the dependencies between tasks of the list of tasks. The priority algorithm may for example be user defined. The priority algorithm may indicate the order in which the tasks of the list of tasks needs to be performed.

The scheduler may be configured to assign different functions to respective threads of the set of threads 115A-N. For example, after selection of the task, the execution of the scheduler 118 may cause the current master thread 115B to determine or find an available slave thread of the set of threads 115A-N. An available thread may, for example, be a thread that is an idle thread. For that, the current master thread 115B may loop over all threads in the pool of threads 113 in order to find a slave thread that is idle.

In case (inquiry step 205) an available slave thread e.g. 115D is identified or found in the set of threads 115A-N, the current master thread 115B may inform the scheduler 118 of the found available slave thread 115D. The scheduler 118 may assign the execution of the selected task in step 207 to the identified thread 115D.

However, in case (inquiry step 205) none of the slave threads of the set of threads 115A-N is available, the current master thread 115B may switch in step 209 to the slave mode. This may result in an additional slave thread 115B.

The selected task may be executed in step 211, by the identified thread 115D or by the additional slave thread 115B. That is, if none of the slave threads of the set of threads is available, the current master thread 115B may switch to the slave mode and execute the selected task. However, if an available thread is found, this available thread may receive the task and may execute it. The thread that executes the selected task, may first read its input queue to read input data of the selected task before executing the selected task, wherein the execution of the thread may be performed by one of the cores 111A-N.

As described with reference to FIG. 3, the slave threads once they complete their task, they try to switch to the master mode. This switching to the master mode is performed if there is no other thread of the set that is a master thread for the scheduler 118. Thus, in case the current master thread 115B has switched to the slave mode, an available slave thread of the set of threads 115A-N switches in step 213 to the master mode to become the current master thread. In one example, this slave thread that switched to the master mode may be a slave thread that previously executed a task of the list of tasks of the same scheduler 118. In another example, any available slave thread may be configured to be the master thread for the scheduler 118. This slave thread that switched to the master mode may, for example, be the master thread 115B itself e.g. if after switching to become the slave thread it was the first thread of the set of threads to complete its task and become available.

If (inquiry step 215) there is a remaining task of the list, steps 201-215, may be repeated for performing the remaining tasks of the list of tasks. Steps 201-215 may be referred to as the task computation. For example, in each iteration a task of the list may be performed. In each iteration of steps 201-215, the current master thread may change e.g. for the first execution of the method the thread 115B was master thread, however after multiple iterations of steps 201-215 another thread e.g. 115D may become the master thread for the scheduler 118.

Figure 5:
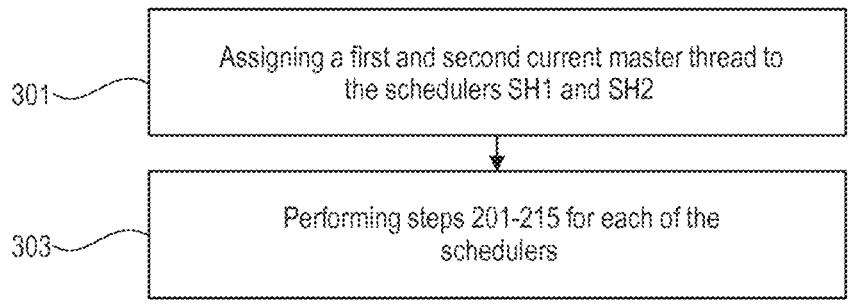
FIG. 5 is a flowchart of a method for performing tasks of multiple schedulers in accordance with an example of the present subject matter.

FIG. 5 is a flowchart of a method for performing tasks of multiple schedulers (e.g. two schedulers SH1 and SH2) in accordance with an example of the present subject matter. For the purpose of explanation, the method may be implemented in the system illustrated in FIG. 3, but is not limited to this implementation.

Each of the schedulers SH1 and SH2 may be assigned or associated with a respective first and second list of tasks to be performed. The first list of tasks may be independent of the second list of tasks. However, tasks within each of the first and second list may be dependent tasks.

Each of the schedulers SH1 and SH2 may be assigned in step 301 to a respective first and second current master thread of the set of threads. In step 303, the method steps 201-215 may be performed for each of the schedulers SH1 and SH2. In one example, at least part of the steps 201-215 may be performed in parallel for the two schedulers SH1 and SH2.

Figure 6:
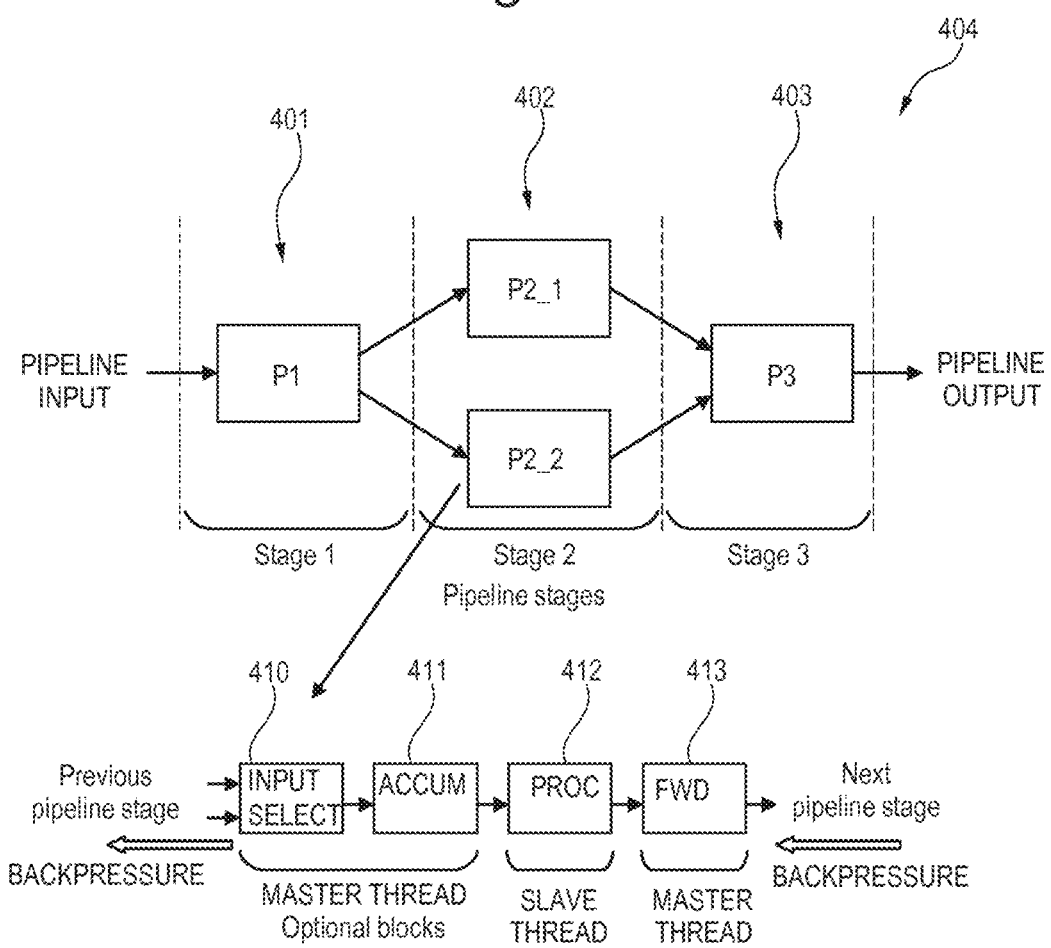
FIG. 6 is a block diagram illustrating a list of tasks for a given scheduler in accordance with an example of the present subject matter.

FIG. 6 is a block diagram illustrating a list of tasks for a given scheduler in accordance with an example of the present subject matter.

For example, a pipelining scheme may be used to define a pipeline 400 for processing data. The pipeline 400 may be divided in stages. FIG. 6 shows three stages 401-403, for simplification purpose but it is not limited to. Each stage completes one or more tasks and the stages are related one to the next to form a pipeline. The tasks of a same stage may for example be executed in parallel.

A shown in FIG. 6, the first stage 401 has a single task P1. The task P1 may be the first task of the pipeline 400. The task P1 may receive the input data of the pipeline 400. The task P1 may provide output to two different tasks P2_1 and P2_2 of the second stage 402. The two tasks P2_1 and P2_2 provide their respective output to a task P3 of the last stage 403. The task P3 may provide a desired output of the pipeline 400. The pipeline provides a list of tasks comprising tasks P1, P2_1, P2_2 and P3.

FIG. 6 further shows a functional splitting of a task in accordance with an example of the present subject matter. Each of the tasks P1, P2_1, P2_2 and P3 may be divided into a sequence of functions. FIG. 4 shows the task P2_2 of the stage 402 as divided into four functions 410-413.

The function 410 selects which input to run from a previous pipeline stage 401. This function may be an optional function as it may only be used if the pipeline stage 402 has more than one input to select from. E.g. the task P3 may use function 410 to select which of the two inputs of the stage 402 to be used. The function 410 may be named INPUT SELECT function.

The function 411 may enable to accumulate multiple inputs. This function may be used as in some data processing cases multiple inputs may be accumulated before actual processing can start. For example, crosstalk cancellation between multiple channels may use an input from each channel to continue execution. The function 411 may be named ACCUM function.

The function 412 is a task processing function which may be the computationally intensive part of the task. Typically, this task processing function may be computed concurrently with consecutive processing tasks and it is executed by a slave thread. The function 412 may be named PROC function.

Once a processing result of the task is ready, the output may be sent to the next pipeline stage 403 by function 413. The function 413 may also forward an indication of or a reference to a next task to be performed. As shown with stage 402, a single output may lead to multiple forwards. It may be that the next pipeline stage is not ready e.g. if the previous stage is not completed, then the function 413 gets backpressure and may retry later. The function 413 may be named FWD function.

The functions 410, 411 and 413 may be data input preparation functions. They may be executed by a master thread. These data input preparation functions may be executed in accordance with a serial execution as the order of their outputs may be used. The task processing function 412 may be executed by a slave thread and may potentially have concurrent execution with other processing functions 412 of consecutive tasks.

Figure 7:
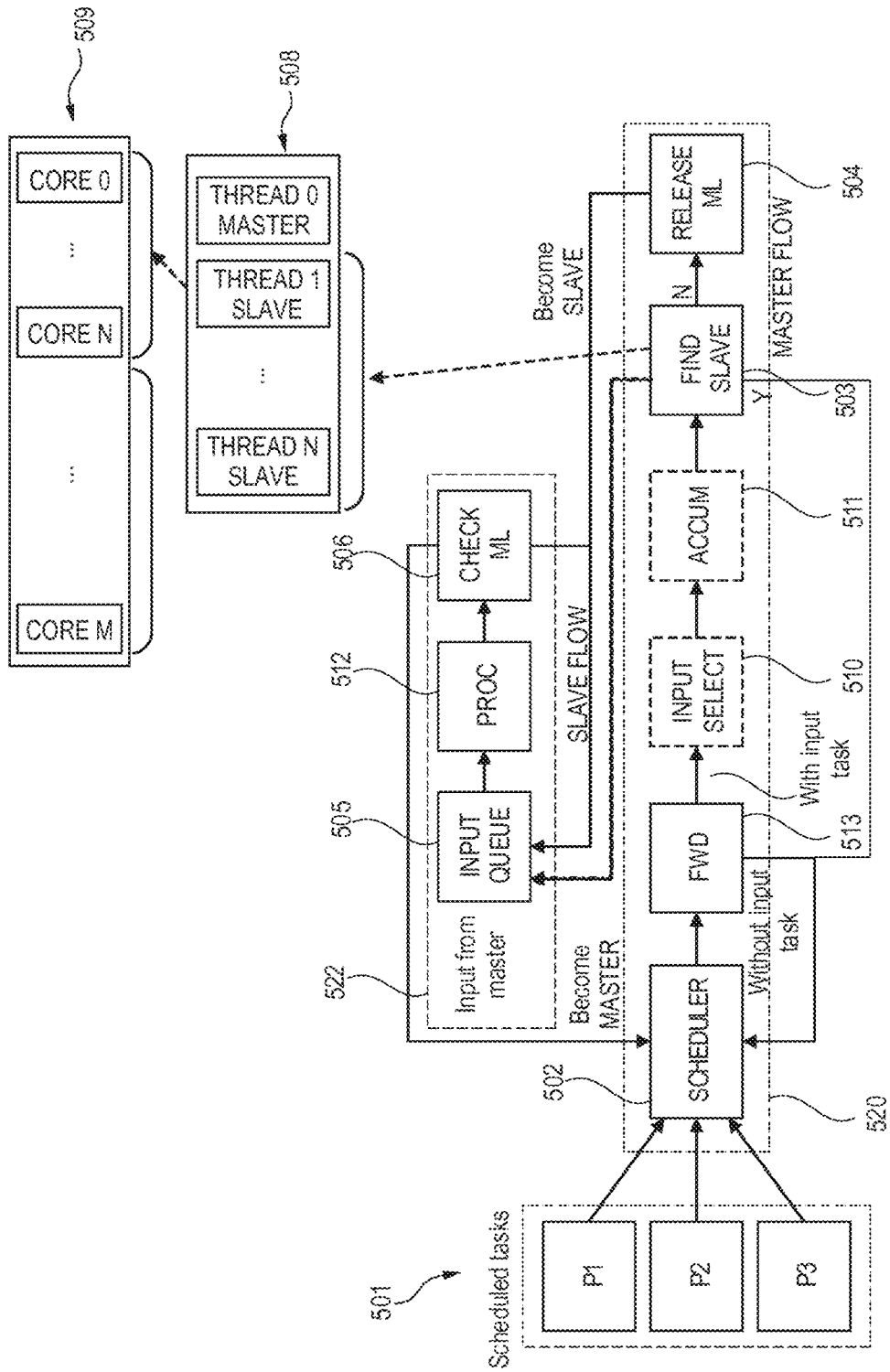
FIG. 7 is a block diagram illustrating a method for executing a list of tasks in accordance with an example of the present subject matter.

FIG. 7 is a block diagram illustrating a method for executing a list of tasks 501 in accordance with an example of the present subject matter. The list of tasks 501 may be the tasks of a pipeline that may need to be executed in a given order e.g. as described with reference to FIG. 6. The list of tasks may be assigned to a scheduler 502 from which the scheduler 502 can choose using a priority algorithm a task to be performed. The scheduler 502 may be associated with a master thread. As described with reference to FIG. 6, each task of the tasks 501 may comprise the functions 510-513 which are defined as described with the functions 410-413 respectively.

FIG. 7 further illustrates uniform processing resources being partitioned into pools. FIG. 7 shows a pool of threads 508 in which each thread can operate in slave or master mode. A thread in master mode may be configured to execute steps of a master flow 520. A thread in slave mode may be configured to execute steps of a slave flow 522. Each thread of the pool 508 may switch between the slave and master mode.

Each thread of the thread pool 508 may be executed by a respective core of a pool of cores 509. Each thread in the thread pool 508 executes either the master flow 520 or the slave flow 522. A thread holding the master lock of the scheduler 502 executes the master flow which starts with a scheduling function. After selection of a task of the list of tasks 501, the task may be scheduled and the master thread may execute the task supplied FWD function 513 for enabling results of a previously selected and scheduled task. This may enable to first check whether a previous result is ready to the FWD function 513 in order to forward the results. This may make room in the pipeline 400 and prevent data staying in the pipeline increasing latency. For example, a given task may be scheduled even when it does not have a new input task data. The input task data may comprise the result of a previous task on which the given task depends and reference/pointer to instructions of the given task in order to be executed by a slave thread. The FWD function 513 may be scheduled on its own when a previously launched task is being executed by a slave thread. This prevents that the result of a slave function stays in the pipeline until a next task of that pipeline stage is executed.

Therefore, if the FWD function 513 has not yet new input task data, the master flow goes back to the scheduler 502. This FWD only loop by the master thread functions as regular polling for completion of already asynchronously running tasks on slave cores.

Next, the INPUT SELECT and ACCUM functions of the selected master thread are run. The master thread may try to find (503) an idle slave thread from the pool 508 to divest the work to. It does so by looping over all threads in the thread pool 508, and as soon as it finds a thread that is idle, it returns to the scheduler with the thread selection. If it does not find a slave thread, it may release the master lock associated with the scheduler it holds and start executing the task itself, but now as a slave thread. Once the master becomes a slave, the thread pool may not have any thread anymore doing the master flow 520 of work, as all threads in the pool may be executing a processing task as slaves.

When a thread in thread pool 508 is started, it starts by default as a slave checking its input queue 505. There it waits on work sent by a master thread. Once it gets work to do, it executes the PROC function 512 from the selected task. After the work is done, the slave thread tries to acquire (506) the master lock from the scheduler 502 that gave it the task to work on. If this acquiring of the master lock succeeds, it becomes the master thread running the scheduler.

The master lock functionality can e.g. be performed by a mutex, which is a synchronization mechanism for enforcing limits on access to a resource (in this case the master lock). Other functionally equivalent implementations to a mutex such as for example a semaphore, as is well known by a skilled person in the art, may be used.

Figure 8:
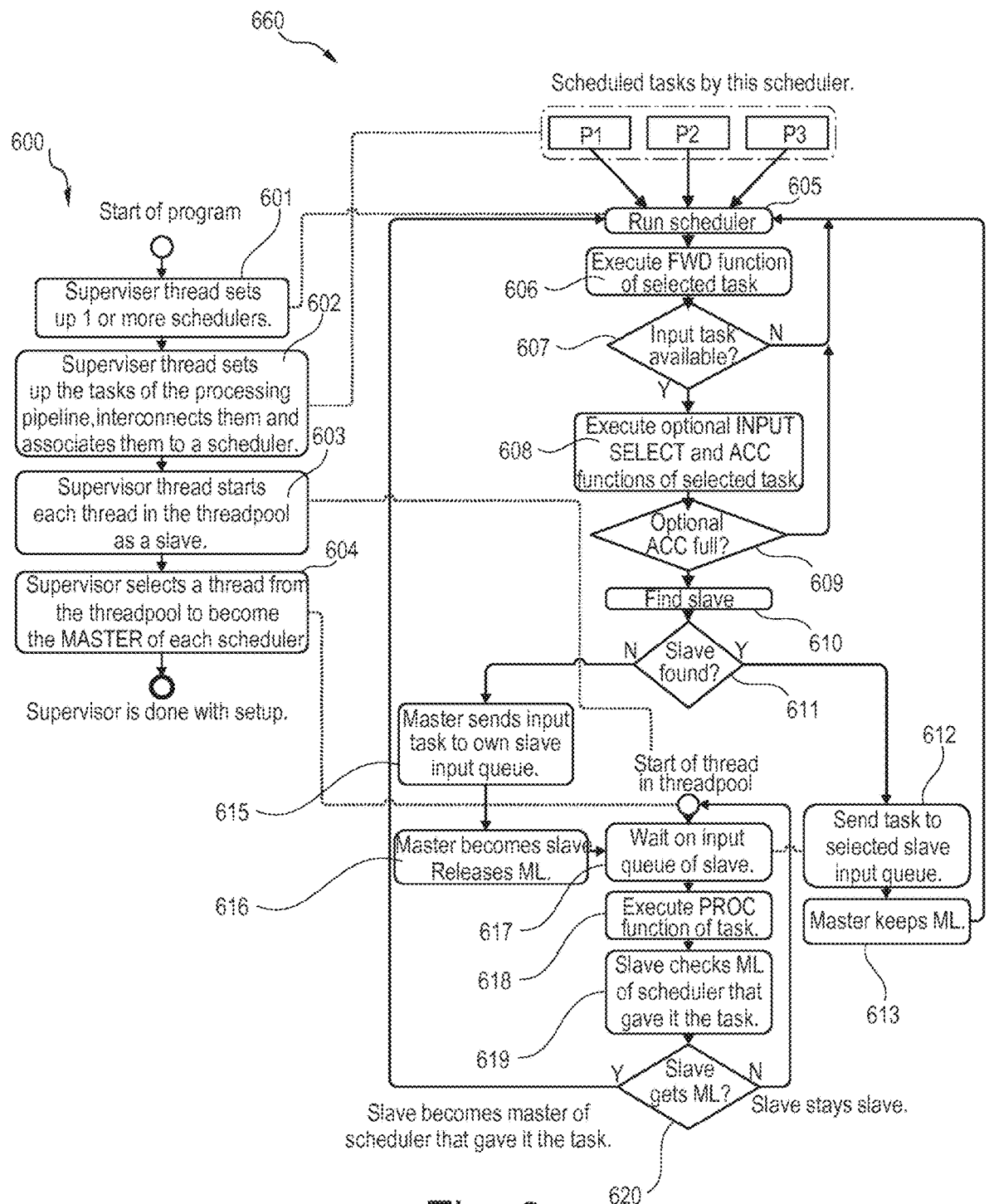
FIG. 8 is a flowchart of a method for performing tasks of in accordance with an example of the present subject matter.

FIG. 8 is a flowchart of a method for performing tasks of in accordance with an example of the present subject matter. For the purpose of explanation, the method may be described with reference to previous FIGS. 3-7, but is not limited to this implementation.

The method may comprise an initialization phase 600 and task execution phase 660. The initialization phase 600 may be performed by a supervisor thread such as supervisor thread 120.

In step 601, one or more schedulers may be set up by the supervisor thread 120. The supervisor thread 120 may set up in step 602 tasks such as tasks of the pipeline 400. The tasks may be interconnected based on their dependencies and may be associated to one of the setup schedulers of step 601. This is indicated in FIG. 7, where tasks P1, P2 and P3 are being scheduled by scheduler. The supervisor thread 120 may start in step 603 each thread in the thread pool 508 as a slave thread. For each scheduler of the setup schedulers, the supervisor thread 120 may select in step 604 a thread from the thread pool 508 to become the master thread of the scheduler.

Thus, the initialization phase 600 may result in at least one list of tasks being assigned to a scheduler and one thread becoming a master of each scheduler. After completing the setup part, the task execution phase 660 may be performed.

The scheduler to which the list of tasks was associated in step 602 may be run in step 605 via the associated master thread performed by the appointed master core. This may result in a task of the list of tasks being selected (after being scheduled by the scheduler). The FWD function 413 of a previously selected task may be executed by the master thread in step 606. It may be determined (inquiry step 607) if an input task data is available after executing the FWD function 413. The input task data may comprise results of a previously executed task on which the selected task depends and references to the selected task so that as slave thread can use that reference to execute the selected task. The input task data is available if the results are available.

If the input task data is not available, steps 605-607 may be repeated. If the input task data is available, the INPUT SLECT and ACCUM functions 410-411 may be executed in step 608 by the master thread. It may be determined (inquiry step 609) if all input data required by the selected task are accumulated. If all input data required by the selected task are not accumulated, steps 605-609 may be repeated, otherwise the master thread may search for an available slave thread in step 610.

If (611) a slave thread is available, steps 612 and 613 may be performed, otherwise steps 615 to 620 may be performed.

In step 612, the master thread may send the selected task to the available slave thread so that the master thread can keep its master lock in step 613. After step 613, steps 605-620 may be repeated using the same master thread used in the first execution of steps 605-620 to process a further task of the list. The repetition may be performed until the tasks are executed.

In step 615, the master thread may send the selected task to its input queue and may release the master lock in step 616. In step 617, the slave thread that results from step 616 may wait on the input queue in order to execute in step 618 the PROC function of the selected task. This means that after releasing the master lock there may be only slave threads in the pool 508. After completing the execution of the task, the slave thread may check in step 619 the master lock of the scheduler. It may be determined (inquiry step 620) if the slave thread has acquired the master lock. If so, the slave thread may become the master thread and steps 605-620 may be repeated using the new master thread to process a further task of the list. The repetition may be performed until the tasks are executed. If the slave thread has not acquired the master lock (inquiry step 620), the slave thread stays as it is and may be used in another iteration of the present method.

Figure 9:
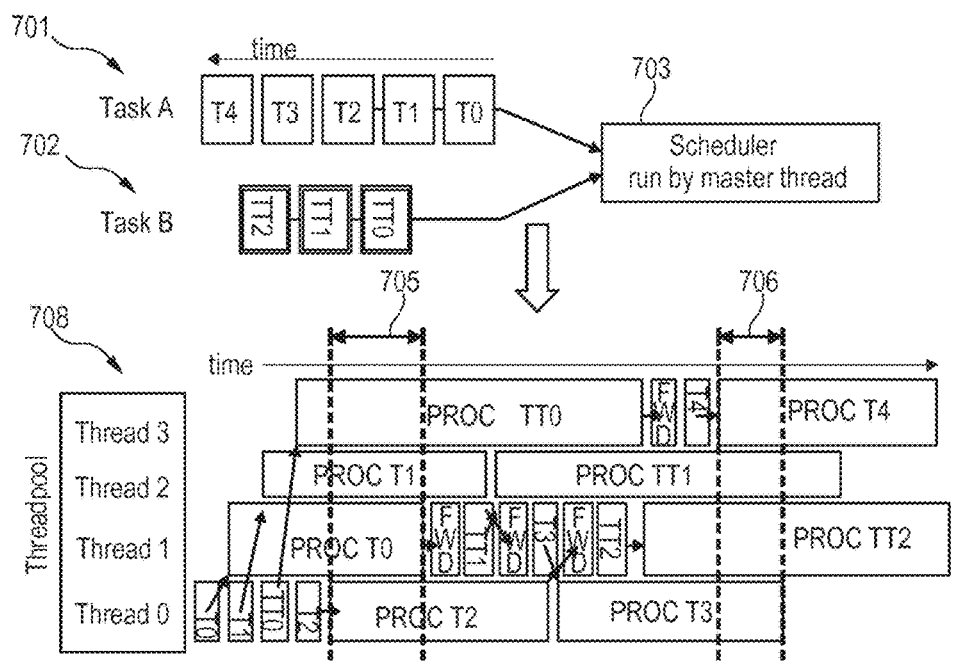
FIG. 9 is a diagram illustrating the execution of two lists of tasks in accordance with an example of the present subject matter.

FIG. 9 is a diagram illustrating the execution of two lists of tasks A 701 and B 702 in accordance with an example of the present subject matter. The list of tasks 701 comprises tasks T0, T1, T2, T3 and T4. The list of tasks 702 comprises tasks TT0, TT1 and TT2. FIG. 9 also indicates the order in which the tasks of the two lists are received at a scheduler 703 e.g., the tasks are arriving at the scheduler 703 in a certain timing. FIG. 9 shows a thread pool 708 of four threads that is used to execute the tasks.

Thread 0 of the pool 708 starts as the master thread of the scheduler 703 and distributes the arriving tasks T0, T1 and TT0 to the slave threads 1, 2 and 3 respectively. For the 4th task T2 that arrives, the master can't find another slave thread because they are all running the RPOC functions as indicated in FIG. 9, so it starts executing the task T2 itself after switching itself to a slave thread by releasing the master lock.

Since thread 1 is the first slave thread to finish its task after the thread 0 has switched to slave mode, it acquires the free master lock and executes the scheduler 703. The executed scheduler by thread 1 may schedule task TT1 and may assign execution of the FWD function of the previous task T0 to the thread 1. Once the FWD function of the previous task T0 is executed, and thread 2 is identified as idle thread, the resulting output may be used as input for the PROC function of the selected task TT1 and the PROC function of TT1 may be executed by the thread 2. Rotation of master functionality and executing slave PROC function continues in this way as indicated in FIG. 9 maximizing the use of the available physical resources.

FIG. 9 shows two time periods 705 and 706 during which no master thread exists in the pool 708 and all available cycles are used for the execution of the PROC functions. With the present method, the master thread does not have to wait during the time periods 705 and 706 and can starts executing itself the PROC function.

When the processing load is high, all threads in the thread pool can contribute to executing computationally complex tasks so that cycles may not be wasted. As illustrated in FIG. 9, at time 705 and 706, no master flow is active, and no cycles may be lost in e.g. trying to schedule tasks for which there are no resources anyway. With the rotation of the master functionality, only a minimum amount of cycles may be used to progress the processing pipeline.

In addition, no scheduling latency may be lost as the first slave thread to finish takes up the master flow. Scheduling of a new task may therefore only be restarted when there are cycles available (at the very least from the previous slave, now master) to progress the pipeline.

The FWD function may always have priority over starting a new PROC function. This keeps buffering of results in the pipeline low which may lower the latency. The FWD function of a running task is scheduled on its own without a new input task. When a system is not fully loaded, the master thread has free cycles and it will poll the currently running PROC slave functions until the results are ready to the FWD function. Such polling of asynchronously running tasks may lead to minimal buffering and thus latency in the pipeline. Therefore, when the processing load is low, the free cycles may be used to minimize latency in the pipeline.

Figure 10:
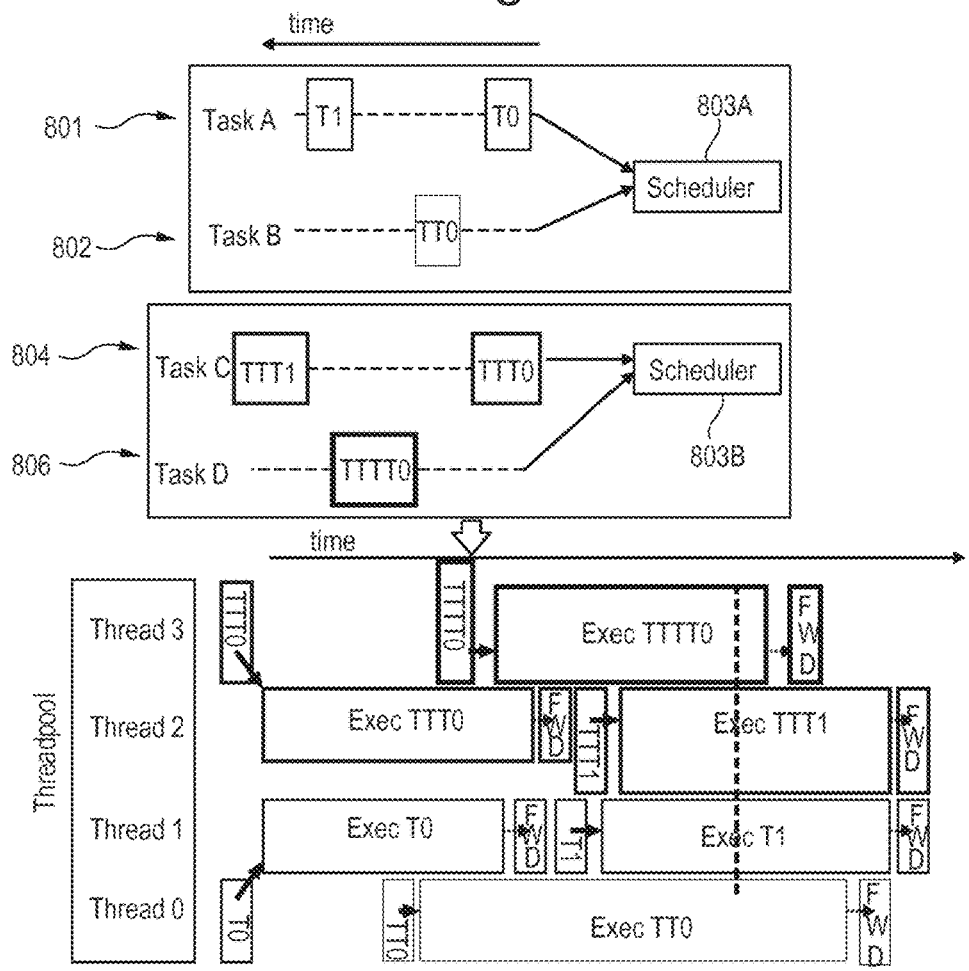
FIG. 10 is a diagram illustrating the execution of four lists of tasks in accordance with an example of the present subject matter.

There can be more than one scheduler (as illustrated in FIG. 10) and therefore more than one master thread active simultaneously on a single thread pool. This may be useful e.g. when the scheduler has too many tasks associated to it and the serial execution of scheduling, FWD, ACCUM and INPUT SELECT functions becomes the bottleneck preventing the concurrent use all available slave threads in the pool. Then two or more schedulers/master threads can be started over which the tasks are split. The major benefit may be that all master threads share the use of the slave threads. This is illustrated in FIG. 10. The present architecture may allow to automatically share processing resources as processing load varies between schedulers.

FIG. 10 is a diagram illustrating the execution of four lists of tasks 801, 802, 804 and 805 in accordance with an example of the present subject matter. FIG. 8 shows two schedulers 803A-B, each being associated with two lists of tasks, and sharing a single 4-core thread pool e.g. 708.

The list of tasks 801 comprises tasks T0 and T1. The list of tasks 802 comprises task TT0. The list of tasks 804 comprises tasks TTT0 and TTT1. The list of tasks 805 comprises a task TTTT0.

In this example, two master threads, thread 0 and thread 3 are running concurrently the schedulers 803A and 803B respectively for enabling scheduling and launching of tasks on the respective slave threads thread 1 and thread 2.

The execution of the scheduler 803A by the thread 0 results in selecting the task T0. The thread 0 identified thread 1 as an available slave thread for executing the task T0. The task TT0 is further selected by the scheduler 803A in another iteration. However, at that time none of the slave threads 1 and 2 are available. In this case, the thread 0 switches to slave mode and executes the task TT0. After completion of task T0, thread 1 switches to master mode for the scheduler 803A. The task T1 is further selected by the scheduler 803A in another iteration after execution by new master thread 1. Since thread 0 is not available, the thread 1 switches to slave mode and executes the task T1.

The execution of the scheduler 803B by the thread 3 results in selecting the task TTT0. The thread 3 identified thread 2 as an available slave thread for executing the task TTT0. The task TTTT0 is further selected by the scheduler 803B in another iteration. However, at that time none of the slave threads is available. In this case, the thread 3 switches to slave mode and executes the task TTTT0. After thread 2 completed task TTT0, it acquires the master mode and the task TTT1 is further selected by the scheduler 803B when executed by the thread 2.

However, at that time none of the slave threads is available. In this case, the thread 2 switches to slave mode and executes the task TTT1.

Thread 0 after completing the task TT0 may become the master thread for the scheduler 803A because the master lock has been released by the thread 1 for execution of task T10.

This method may enable that each thread in the pool can become master of either schedulers depending on the load. Multiple master threads may be useful when there are many tasks at high rate and/or when the serial execution of the master functionality limits the use of parallelism in the thread pool.

The invention claimed is:

1. A multi-processor system comprising:
a processing unit;
one or more additional processing units, wherein the processing unit and the one or more additional processing units are homogenous processing cores, each configured to execute computationally complex functions and computationally simple functions; and
at least one memory for storing instructions, wherein the instructions, when executed by the processing unit, cause the processing unit to:
acquire a master role for executing a master function part of a set of tasks,
execute the master function for searching for an available processing unit among the one or more additional processing units,
wherein in case an available processing unit is found, the processing unit is configured to keep the master role and to control the found available processing unit to perform a slave function part of the set of tasks, and in case no available processing unit is found, the processing unit is configured to release the master role and further execute the slave function part of the set of tasks,
wherein the master function comprises a master to slave switching function for releasing the master role and the slave function comprises a slave to master switching function for acquiring the master role upon termination of the slave function,
wherein the instructions, when executed by the another processing unit, cause the another processing unit having no master role to, upon finishing execution of the slave function, attempt to acquire the master role by repeatedly executing the slave to master switching function for acquiring the master role.

2. The multi-processor system of claim 1, wherein the processing unit is configured to release the master role by releasing a master lock, wherein the acquiring of the master role comprises acquiring the released master lock.

3. The multi-processor system of claim 1, the master function comprising a scheduler for scheduling the set of tasks and an output forwarding function for providing results of a previous task on which the task depends, the slave function comprising a task processing function of at least one task.

4. The multi-processor system of claim 1, further comprising a pool of threads and a supervisor thread, the supervisor thread being configured to set up slave threads and at least one master thread in the pool, wherein the additional processing unit is configured to execute the master function using the master thread of the pool and to execute the slave function using the slave thread of the pool.

5. A network node comprising the multi-processor system of claim 1.

6. A method comprising:
acquiring a master role by a processing unit of a multi-processor system, wherein the multi-processor system includes one or more additional processing units, and wherein the processing unit and the one or more additional processing units are homogenous processing cores, each configured to execute computationally complex functions and computationally simple functions;
executing by the processing unit a master function part of a set of tasks comprising
searching for an available processing unit of the multi-processor system among the one or more additional processing units; wherein in case an available processing unit is found, keeping the master role and controlling the found processing unit to perform a slave function part of the set of tasks, and in case no available processing unit is found, releasing the master role and executing by the processing unit the slave function part of the set of tasks,
wherein the master function comprises a master to slave switching function for releasing the master role and the slave function comprises a slave to master switching function for acquiring the master role upon termination of the slave function, and
attempting, by the one or more another processing units having no master role to, upon finishing execution of the slave function, acquire the master role by repeatedly executing the slave to master switching function for acquiring the master role.

7. The method of claim 6, wherein the execution of the master function is performed using a master thread of a pool of threads of the multi-processor system, and the execution of the slave function is performed using a slave thread of the pool of the threads.

8. The method of claim 7, further comprising using a supervisor thread of the pool for setting up the master thread and slave threads of the pool.

9. A non-transitory computer readable medium storing instructions, which when executed by a processing unit causes the processing unit to perform at least the following:
acquiring a master role;
executing a master function part of a set of tasks by a processing unit comprising
searching an available processing unit of a multi-processor system; wherein in case an available processing unit is found, keeping the master role and controlling the found processing unit to perform a slave function part of the set of tasks, and in case no available processing unit is found, releasing the master role and executing by the processing unit the slave function part of the set of tasks,
wherein the master function comprises a master to slave switching function for releasing the master role and the slave function comprises a slave to master switching function for acquiring the master role upon termination of the slave function,
wherein the instructions, when executed by one or more additional processing units, cause the one or more additional processing unit having no master role to, upon finishing execution of the slave function, attempt to acquire the master role by repeatedly executing the slave to master switching function for acquiring the master role, wherein the processing unit and the one or more additional processing units are homogenous processing cores, each configured to execute computationally complex functions and computationally simple functions.

* * * * *